United States Patent
Holbach et al.

(10) Patent No.: US 10,016,708 B2
(45) Date of Patent: Jul. 10, 2018

(54) PIPELINE STRAINER

(71) Applicant: The Metraflex Company, Chicago, IL (US)

(72) Inventors: Daniel T. Holbach, Palatine, IL (US); James R. Richter, Lincolnshire, IL (US); James Orrico, Evanston, IL (US); Daniel R. Kish, Chicago, IL (US)

(73) Assignee: The Metraflex Company, Chicago, IL (US)

( * ) Notice: Subject to any disclaimer, the term of this patent is extended or adjusted under 35 U.S.C. 154(b) by 2 days.

(21) Appl. No.: 15/130,343

(22) Filed: Apr. 15, 2016

(65) Prior Publication Data

US 2016/0263503 A1    Sep. 15, 2016

Related U.S. Application Data

(63) Continuation-in-part of application No. 14/597,634, filed on Jan. 15, 2015.

(51) Int. Cl.
*B01D 35/02* (2006.01)
*B01D 29/94* (2006.01)
*B01D 29/23* (2006.01)
*B01D 29/96* (2006.01)

(52) U.S. Cl.
CPC ............ *B01D 35/023* (2013.01); *B01D 29/23* (2013.01); *B01D 29/96* (2013.01); *B01D 35/02* (2013.01); *B01D 2201/403* (2013.01)

(58) Field of Classification Search
CPC .... B01D 2201/30; B01D 35/30; B01D 35/02; B01D 35/023
USPC ....... 210/435, 439, 446, 447, 449, 453, 454, 210/459, 460, 299, 303
See application file for complete search history.

(56) References Cited

U.S. PATENT DOCUMENTS

| | | | |
|---|---|---|---|
| 2,792,120 A * | 5/1957 | Tinker | ................... B01D 35/02 210/308 |
| 2,979,209 A | 4/1961 | Nolden | |
| 4,582,605 A | 4/1986 | Rea et al. | |
| 5,718,822 A | 2/1998 | Richter | |
| 2010/0116732 A1 | 5/2010 | Jung | |
| 2014/0027357 A1 | 1/2014 | Morris | |

FOREIGN PATENT DOCUMENTS

| | | |
|---|---|---|
| CN | 202223967 | 5/2012 |
| CN | 203170086 | 9/2013 |

\* cited by examiner

*Primary Examiner* — Madeline Gonzalez
(74) *Attorney, Agent, or Firm* — Greer, Burns & Crain, Ltd.

(57) ABSTRACT

A pipeline strainer having a body with a straining element therein. The body has a Y-shape and defines a cavity to receive the straining element. The cavity may be defined in part by a recess that comprises a surface which may be used to guide the straining element as it is inserted into the cavity. The recess may form a dome. The recess, when viewed cross sectionally, may have a linear segment and a curvilinear segment. A rounded protrusion may be created on an outer surface of the body as a result of the recess.

12 Claims, 12 Drawing Sheets

PIPELINE STRAINER

CROSS-REFERENCES TO RELATED APPLICATIONS

This application is a continuation in part of U.S. application Ser. No. 14/597,634, filed on Jan. 15, 2015, the entirety of which is incorporated herein by reference.

BACKGROUND OF THE INVENTION

The present invention relates to a pipeline strainer and more particularly to a Y shaped pipeline strainer which has a decreased pressure drop associated with fluid flowing there through.

Pipeline strainers are used for protecting pumps, compressors, turbines, meters, automatic valves, sprinkler heads, nozzles, steam traps, heat exchangers, meters, and other pipeline equipment. The pipeline strainer mechanically removes solids from a flowing fluid with a perforated, mesh, or wedge wire straining element. The solids are retained in the straining element, allowing the fluids to flow there through and to the downstream equipment. After a certain period of time, a drain can be opened to remove the debris to avoid excess pressure drop associated with the collection of solids in the straining element.

Two common designs for pipeline strainers are the Y shaped pipeline strainers (see, e.g., FIG. 3 of U.S. Pat. No. 5,718,822) and the basket pipeline strainer (see, e.g., FIG. 4 of U.S. Pat. No. 5,718,822). Most basket pipeline strainers are intended for horizontal or slightly inclined piping. On the other hand, the Y shaped pipeline strainers, as well as some T shaped basket strainers, can be used in horizontal, as well as vertical (downward), piping. In the Y shaped pipeline strainers, a debris collection chamber, which houses the straining element, is disposed obliquely to the flow path of the fluid thorough the pipeline strainer.

With respect to the Y shaped pipeline strainers, inserting the straining element in the body of the pipeline strainer typically requires a large opening at the end of the debris collection chamber. The opening is closed by an end cap during operation with a large flange containing a series of bolts. The flange is large, requires gaskets, and is a potential leak point. Additionally, the flange impacts the amount of the straining element that may be disposed in the flow path of the fluid due to interference with another flange typically associated with the outlet of the pipeline strainer.

It would be desirable to provide for a pipeline strainer which increases the amount of straining element in the flow path of the fluid.

Additionally, it would also be desirable to provide a pipeline strainer that does not require a flange at the bottom of the debris collection chamber.

Furthermore, it would also be desirable to have a pipeline strainer that allows for easier insertion and maintenance of the straining element in a pipeline strainer.

SUMMARY OF THE INVENTION

A new pipeline strainer has been invented which decreases the pressure drop associated with fluid passing there through. Additionally, the pipeline strainer is easy to drain and clean. Furthermore, the pipeline strainer may allow for easier insertion of the straining element. These and other benefits will be appreciated in the following summary and detailed description.

According to a first aspect of the present invention, the present invention provides a pipeline strainer comprising a body and a straining element. The body comprises an inlet for a fluid, an outlet for the fluid, a debris drain, and a cavity inside of the body. The inlet and outlet are disposed on opposite ends of the body forming a longitudinal axis. The cavity includes a first recess forming a dome and having an inner surface forming a portion of the cavity. The straining element is configured to be disposed in the cavity and includes a first open end and a second end opposite the first open end. The first open end of the straining element is configured to be disposed proximate the inlet of the body. The second end of the straining element is configured to be disposed proximate the debris drain. A longitudinal axis of the straining element extends from the first open end to the second end such that an angle between the longitudinal axis of the straining element and the longitudinal axis of the body is less than 90°.

In one or more embodiments of a pipeline strainer according to the various aspects of the present invention, the pipeline strainer further comprises comprising a shoulder disposed between the inlet and the first recess, the shoulder being configured to receive a portion of the first end of the straining element. A portion of the inner surface of the first recess may include a retaining surface configured to maintain the first end of the straining element in the shoulder.

In one or more embodiments of a pipeline strainer according to the various aspects of the present invention, the straining element comprises a hollow body, and the first end of the straining element lies in a plane that is oblique to the longitudinal axis of the straining element. The second end of the straining element may be located in plane perpendicular to the longitudinal axis of the straining element.

In one or more embodiments of a pipeline strainer according to the various aspects of the present invention, the pipeline strainer further comprises a cover plate configured to be removably secured to the body. The cover plate may preferably include the debris drain. The cover plate may include a second shoulder configured to receive the second end of the straining element.

In one or more embodiments of a pipeline strainer according to the various aspects of the present invention, the straining element is disposed such that the angle between the longitudinal axis of the body and the longitudinal axis of the straining element is between 1 and 30°.

According to a second aspect of the present invention, the present invention provides a pipeline strainer comprising a body and a straining element. The body may comprise an inlet for a fluid, an outlet for the fluid, a debris drain and a cavity inside of the body. The inlet and outlet are disposed on opposite ends of the body and form a longitudinal axis. The straining element may be disposed in the cavity and includes a first open end and a second end opposite the first open end. The first open end of the straining element may be disposed proximate the inlet of the body and the second end of the straining element may be disposed proximate the debris drain. A longitudinal axis of the straining element extends from the first open end to the second end and an angle between the longitudinal axis of the body and the longitudinal axis of the straining element is between 1 and 30°. The cavity of the body is defined in part by a surface which includes a curvilinear portion and a linear segment when the body is viewed cross-sectionally through a plane that includes the longitudinal axis of the straining element and the longitudinal axis of the body.

In one or more embodiments of a pipeline strainer according to the various aspects of the present invention, the curvilinear portion of the surface comprises a concave segment. The curvilinear portion of the surface may further comprise a convex segment. The concave segment may be disposed between the convex segment and the linear segment. The convex segment may be disposed adjacent the inlet and between the inlet and the linear segment In one or more embodiments of a pipeline strainer according to the various aspects of the present invention, the linear segment is parallel with the longitudinal axis of the body.

In one or more embodiments of a pipeline strainer according to the various aspects of the present invention, the straining element comprises a hollow body, and the first end of the straining element lies in a plane that is oblique to the longitudinal axis of the straining element.

In one or more embodiments of a pipeline strainer according to the various aspects of the present invention, the second end of the straining element is located in plane perpendicular to the longitudinal axis of the straining element.

According to a third aspect of the present invention, the present invention provides a pipeline strainer comprising a body, a cover plate for a portion of the body, and a straining element. The body comprises an inlet for a fluid, an outlet for the fluid, a cavity inside of the body, an outer surface, and a protrusion disposed on the outer surface of the body. The inlet and outlet are disposed on opposite ends of the body. The cover plate is configured to be removably secured to the body and may include a debris drain. The straining element is configured to be disposed in the cavity and includes a first open end and a second end opposite the first open end. The first open end of the straining element may be configured to be disposed proximate the inlet of the body and the second end of the straining element may be configured to be disposed proximate the debris drain.

In one or more embodiments of a pipeline strainer according to the various aspects of the present invention, the protrusion and the cover plate are located on opposite sides of the outer surface of the body.

In one or more embodiments of a pipeline strainer according to the various aspects of the present invention, the protrusion is disposed proximate the inlet of the body.

In one or more embodiments of a pipeline strainer according to the various aspects of the present invention, a longitudinal axis of the straining element extends from the first open end to the second end, and the straining element comprises a hollow body. The first end of the straining element preferably lies in a plane that is oblique to the longitudinal axis of the straining element and the second end of the straining element is located in plane perpendicular to the longitudinal axis of the straining element.

These and other aspects and embodiments of the present invention will be appreciated by those of ordinary skill in the art based upon the following description of the drawings and detailed description of the preferred embodiments.

BRIEF DESCRIPTION OF THE DRAWINGS

The attached figures in the drawings will make it possible to understand how the invention can be produced. In these figures, similar reference numbers denote similar elements.

DETAILED DESCRIPTION OF THE PREFERRED EMBODIMENTS

As mentioned above, a new pipeline strainer has been invented which decreases the pressure drop associated with fluid passing therethrough. A pipeline strainer according to one or more embodiments is believed to reduce the pressure drop associated with the fluid flowing there though by increasing the area or amount of the straining element in the flow path of the fluid.

Without intending to be bound or limited to any particular configuration, it is believed that the amount has been increased because the flange at the bottom of the debris collection chamber has been eliminated, the first end of the straining element has been moved closer to the inlet of the pipeline strainer, the bottom of the debris collection chamber has been moved closer to the outlet, or a combination thereof. Either of these, alone or in combination, allows the debris collection chamber to be less obliquely positioned to the flow path of the fluid through the pipeline strainer. This change (decrease) in the angular relationship is believed to increase the amount of the straining element that can be disposed in the flow path of the fluid. As will be appreciated, increasing the amount of straining element in the flow path will lower the pressure drop associated with the fluid flowing through the straining element.

Additionally, without the flange at the end of the debris collection chamber, simpler designs can be used to allow for the debris collection chamber to be opened and cleaned much more easily than conventional designs.

Furthermore, such designs allow for lighter pipeline strainers because the size of the body may decrease.

Accordingly, with reference the attached drawings, one or more embodiments of the present invention will now be described with the understanding that the described embodiments are merely preferred and are not intended to be limiting.

Figure 1:
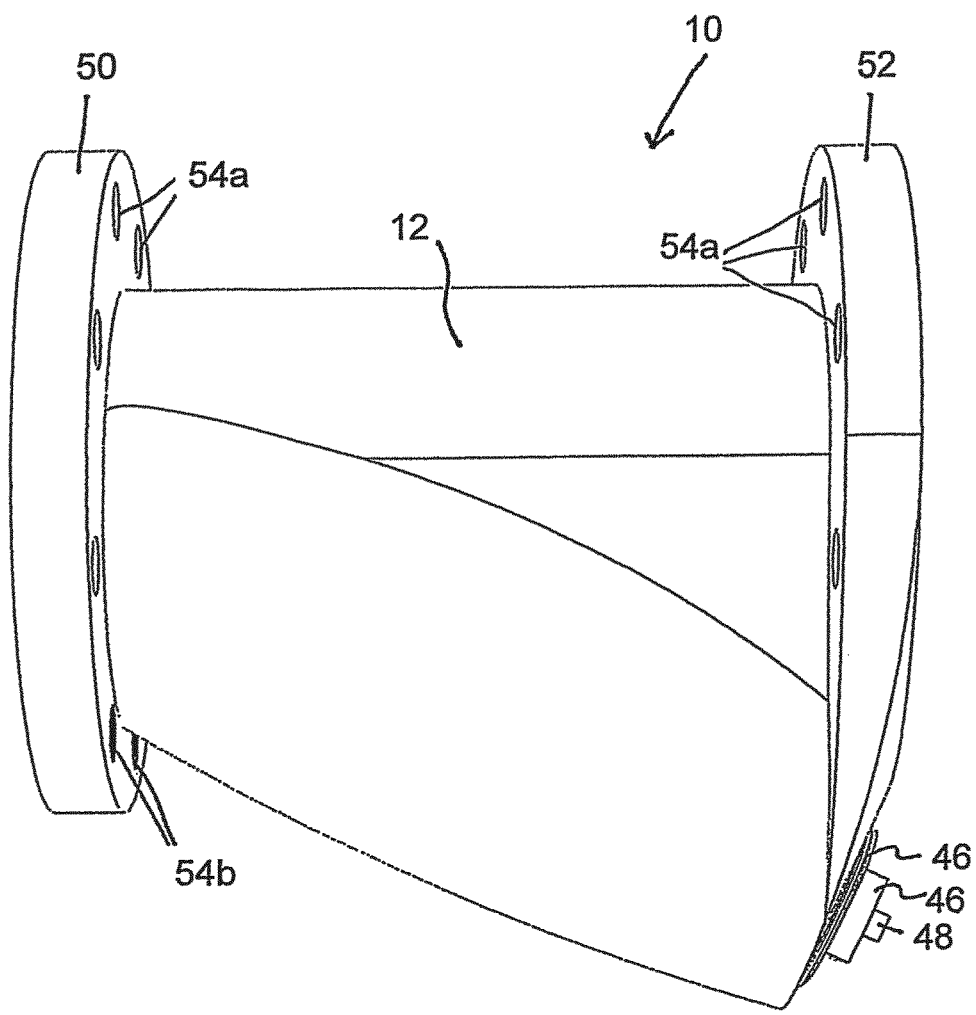
FIG. 1 is a side perspective view of a pipeline strainer according to one or more embodiments of the present invention.

With reference to FIG. 1, a pipeline strainer 10 according to one or more embodiments of the present invention comprises a body 12 with a Y shape. The body 12 can be made from a variety of appropriate materials, including, for example, iron, carbon steel, carbon moly, stainless steel, chrome moly, aluminum, bronze, monel, nickel, HASTELLOY® B, HASTELLOY® C, titanium, and plastic.

Figure 2:
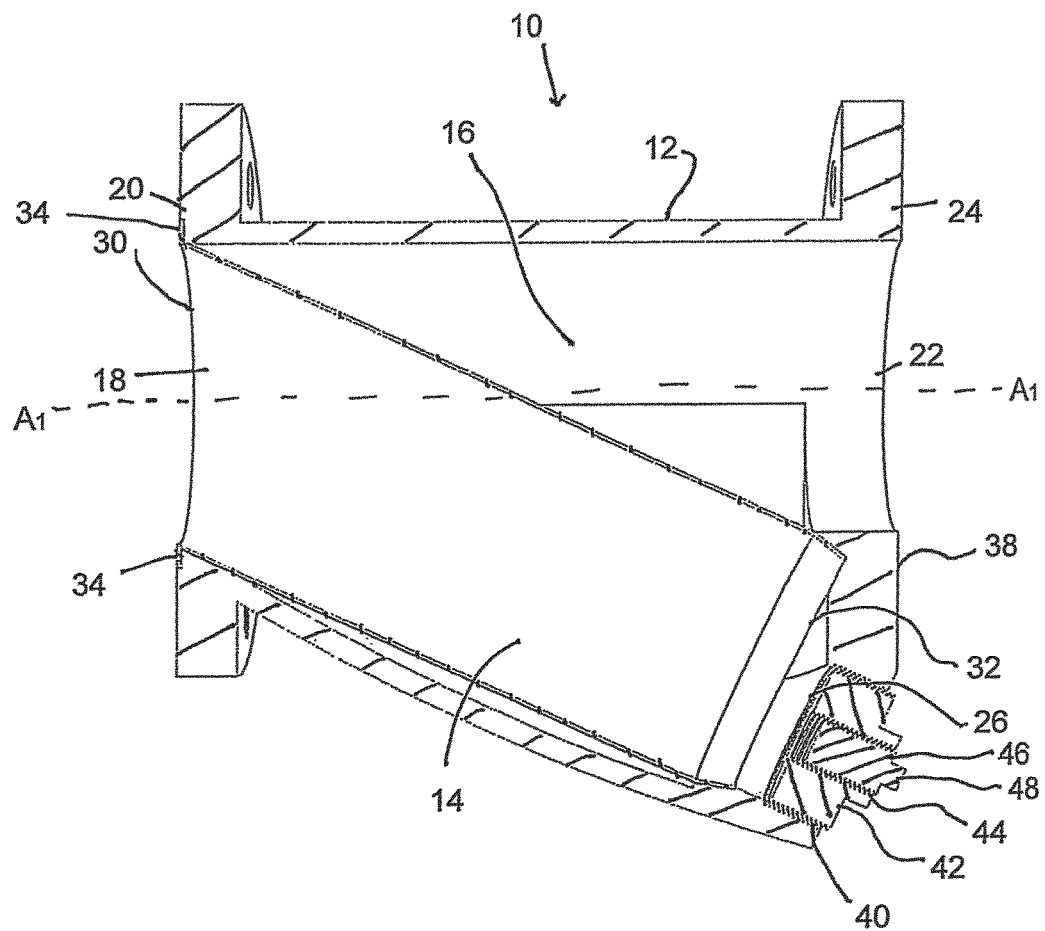
FIG. 2 is a cutaway side perspective view of the pipeline strainer shown in FIG. 1.

Turning to FIG. 2, the pipeline strainer 10 also includes a straining element 14. The body 12 also includes a cavity 16 disposed inside of the body 12. The body 12 includes an inlet 18 to the cavity 16 for a fluid disposed at a first end 20 of the body 12. An outlet 22 from the cavity 16 for the fluid is disposed at a second end 24 of the body 12. The inlet 18 and outlet 22 of the body 12 are both generally disposed along an axis $A_1$.

Figure 3:
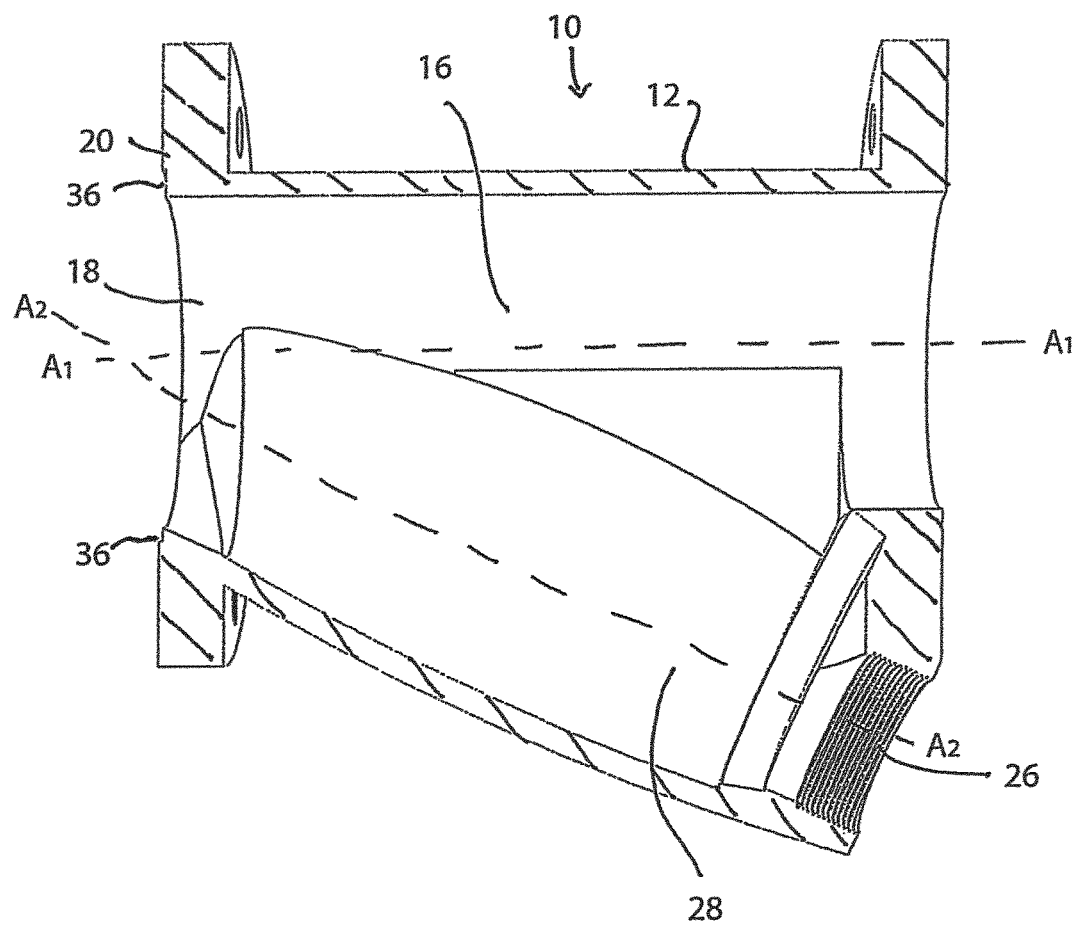
FIG. 3 is another cutaway side perspective view of the pipeline strainer shown in FIG. 1 with a straining element and plug removed from the pipeline strainer.

As can be seen best in FIG. 3, the body 12 also includes a debris drain 26 that is disposed in a portion of the cavity 16 that comprises a debris collection chamber 28. An axis $A_2$ of the debris collection chamber 28 is oblique with respect to the axis $A_1$ of the body 12 which includes the inlet 18 and the outlet 22. The angular relationship of the axes $A_1$, $A_2$ provides the body 12 with the Y shape. Compared with conventional designs, the designs according to the present invention may be less obliquely angled. More specifically, conventional designs may include an angle between the axis $A_2$ of the debris collection chamber 28 and the axis $A_1$ of the body 12 that is between 30 to 60°. According to some of the embodiments of the present invention, the angle between the axis $A_2$ of the debris collection chamber 28 and the axis $A_1$ of the body 12 may be less than 30° and greater than 9.5°. For example, the angle between the axis $A_2$ of the debris collection chamber 28 and the axis $A_1$ of the body 12 may be about 22.0°, 22.5°, 23.0°, 23.5°, 24.0°, 24.5°, 25.0°, 25.5°, 26.0°, 26.5°, 27.0°, 27.5°, 28.0° or 28.5°. By the term "about" with respect to the angle between the axis $A_2$ of the debris collection chamber 28 and the axis $A_1$ of the body 12, it is intended to mean the stated angle +/− 0.3°.

Returning to FIG. 2, the straining element 14 is disposed in the body 12 and removes debris in the fluid passed through the body 12 from the inlet 18 to the outlet 22. Various materials can be used for the straining element 14 including carbon steel, stainless steel, monel, HASTELLOY® B, HASTELLOY® C, alloy 20, nickel, brass, copper, galvanized steel, INCOLOY®, INCONEL®, titanium, aluminum, and plastic, to name a few. The straining element 14 can also be lined with various coatings to minimize corrosion, such as epoxy, asphalt, polytetrafluoroethylene, vinyl, polychlorotrifluoroethene, rubber, neoprene, baked phenolic, and plating with zinc, cadmium, nickel, galvanizing, etc.

A consideration in the selection of a straining element 14 material is the size of the perforations, mesh or wedge wire opening used in the making of the straining element 14 based upon the size and quantity of particles which can pass through downstream equipment without causing damage to the equipment. The use of smaller holes than those actually required, can lead to too-frequent cleaning, excessive pressure drops, and screens constructed of thinner metal which will withstand less pressure differential. Generally, stainless steel perforated metal may be typically obtained in a thickness which is one gage thickness less than the diameter of the punched holes. Carbon steel and brass can be obtained in approximately the same thickness as the hole diameter. A common way to accomplish fine straining in large straining elements 14 is by mesh lining a larger hole, heavier gage perforated plate.

The capacity ratio, or open area ratio (OAR) of the straining element 14 influences such operating characteristics as the length of time it can operate without cleaning and the created pressure loss. The OAR is the relationship between internal cross sectional area (flow area) of the pipe and the open flow area of the material which makes up the straining element 14.

A straining element 14 with at least 100% OAR, or 1-to-1 ratio, would provide an unrestricted flow area equal to that of the pipe while the element was clean. As clogging occurs, however, flow would provide restricted flow, after the element became 50% clogged. A straining element 14 with a 400% OAR is acceptable for general heating and air conditioning service. Additionally, larger OARs would be appropriate for flow in which much debris is expected to be strained or where very viscous fluids are being handled.

When considering the OAR of a straining element 14, there are two accepted methods of analysis used by various specifying agencies and manufacturers. One method maintains a "line of sight" reasoning and uses the multiple of the open areas for elements in series. In this method, a 60% open area material in series with a 40% open area material has a resultant combined open area of 24% (i.e., as in accordance with military standards).

An alternative method allows the open area of the more restrictive element in series to be used. This would be 40% for the example above (i.e. as in accordance with Underwriter Laboratory Standards). The method used influences the estimated operating pressure drop, as well as design decisions such as sizing.

As an example, fuel oils are generally strained to a fine degree to protect small orifices in burner nozzles. This requires a fine woven mesh be used in series with a reinforcing perforated plate. Due to the fact that the perforated plate may have a 50% open area and the mesh 30%, the resultant combined open area may be considered to be only 15% if there is no flow path other than line of sight through the two element in series. This would require a straining element 14 with an OAR of 250%, which would be considered a high capacity, large bodied straining element 14. However, this same straining element 14 using only the perforated plate would have an OAR more than three times as great. Thus, for a given straining element 14, the OAR may be varied by using various perforations or meshes having different open areas.

Most pump installations designed for reasonable velocities will permit approximately a 2-psi drop across the straining element 14. When the straining element 14 becomes clogged, the pressure drop varies with the clogging pattern experienced and the type of the straining element 14 being used. If large amounts of solids are expected, use a straining element 14 with a high net open area. As a straining element 14 becomes clogged to the point where the OAR of the straining element 14 approaches the pipe area, the pressure drop across the straining element 14 increases very rapidly and unpredictably. It is at this point, therefore, that it is recommended the straining element 14 be cleaned, discussed below, otherwise, a large differential pressure will develop. The maximum differential pressure the straining element 14 can withstand varies widely with the straining element 14 type, line size and material used.

Figure 4:
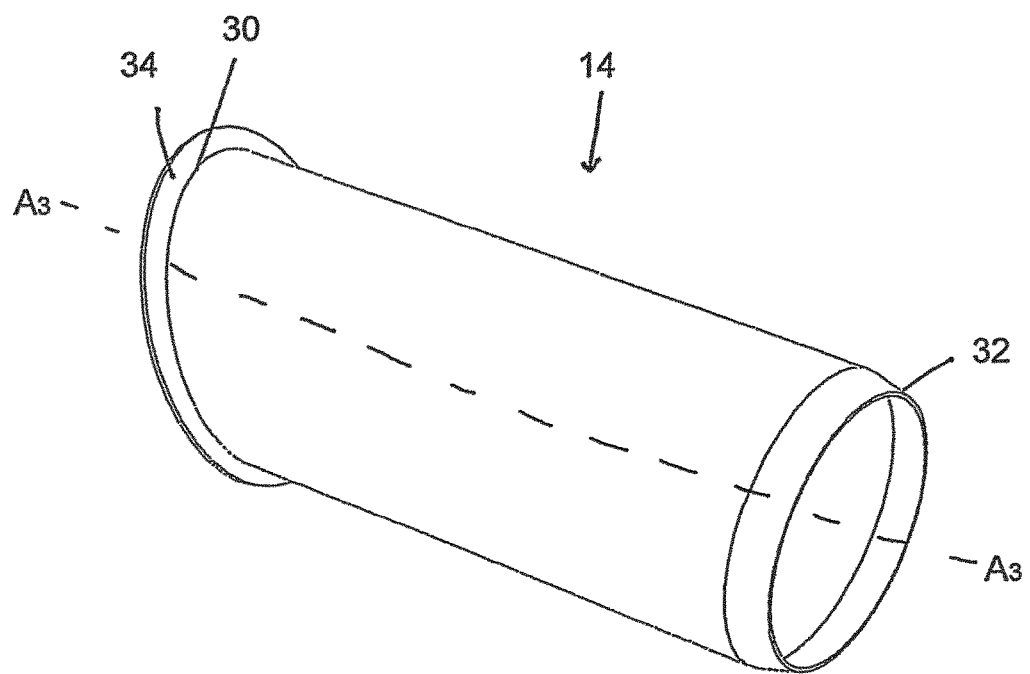
FIG. 4 is an isometric view of a side and back of a straining element used in a pipeline strainer according to one or more embodiments of the present invention.
Figure 5:
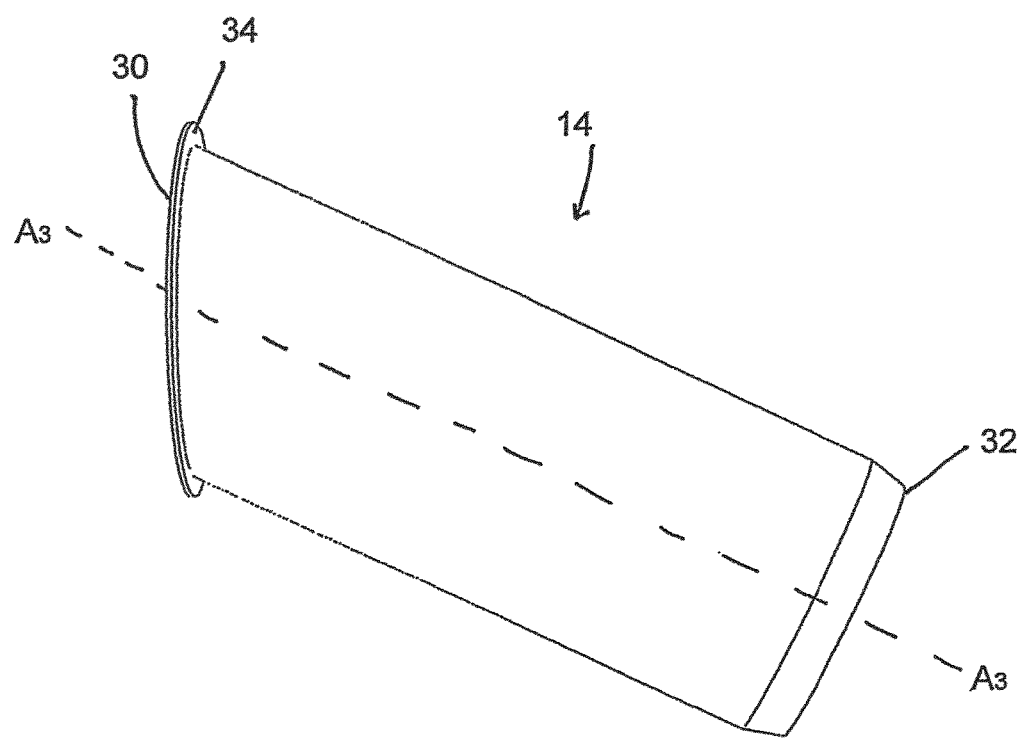
FIG. 5 is a side elevational view of the straining element shown in FIG. 4.

Turning to FIGS. 4 and 5, the straining element 14 includes a first end 30, a second end 32, and a longitudinal axis $A_3$ from the first end 30 to the second end 32. Preferably, both the first end 30 and the second end 32 are open. The second end 32 is disposed proximate the debris drain 26 of the body 12, when the straining element 14 is inserted therein. See, FIG. 2.

In various embodiments, at least the first end 30 of the straining element 14 is planar and lies in a first plane. The second end 32 of the straining element 14 may also be planar and lie in a second plane. In at least one embodiment, the first plane, which includes the first end 30 of the straining element 14, is disposed obliquely to the longitudinal axis $A_3$ of the straining element 14. The second end 32 of the straining element 14 may be disposed perpendicular to the longitudinal axis $A_3$ of the straining element 14.

Additionally, in one or more embodiments, the first plane, which includes the first end 30 of the straining element 14, is disposed generally parallel to a plane formed by the inlet 18 of the body 12. By "generally parallel" it is meant that the planes are +/− 10 degrees from parallel. Although not required, it is preferred that the first end 30 of the straining element 14 and the inlet 18 of the body are coextensive, meaning, the two share at least a portion of the same plane.

As can be seen in more detail in FIG. 2, the first end 30 of the straining element 14 may be coextensive with the inlet 18. Additionally, the first end 30 of the straining element 14 may include a flange 34 extending outwardly away from the straining element 14. The inlet 18 of the body 12 may include a groove 36 or other notched surface sized to receive the flange 34 of the straining element 14. See, FIG. 3.

In one or more of these embodiments, the straining element 14 is configured and sized such that the straining element 14 is inserted into the cavity 16 through the inlet 18 of the body 12. As discussed above, this allows an outer surface 38 of the body 12 proximate the debris drain 26 to be smaller. This, in turn, allows for the longitudinal axis $A_2$ of the debris collection chamber 28 to be brought closer to the longitudinal axis $A_1$ of the body 12. Accordingly, the amount of the straining element 14 that is disposed in the direct flow path of the fluid from the inlet 18 of the body 12 to the outlet 22 of the body 12 can be increased, which will decrease the pressure drop associated with passing the fluid through the pores of the straining element 14.

As mentioned above, since the straining element 14 will remove (or retain) particulate material in the fluid, the straining element 14 must be periodically cleaned. According to various embodiments of the present invention, and as shown in FIG. 2 the debris drain 26 may comprise a threaded bore 40 and a plug 42. The plug 42 includes an outer circumferential surface that is threaded to engage the threaded bore 40. The plug 42 may be sized to be smaller than the second end 32 of the straining element 14.

In a most preferred embodiment, the plug 42 also includes a threaded bore 44 there though, and a second plug 46. The second plug 46 includes a threaded outer circumferential surface that is threaded so as to engage the threaded bore 44 of the first plug 42. An end 48 of the second plug 46 may be configured to cooperate with a tool, such as a wrench, ratchet, or other similar tool that can be used to rotate the first plug 42 and the second plug 46. The threaded bores 44 and 40 may be oppositely threaded, i.e., one including a right-handed thread and the other including a left-handed thread, however, this is not required. In some embodiments or when in use, the second plug 46 may be replaced with a valve (not shown), that allows debris collected in the straining element 14 to be drained by merely opening the valve. The plug 42, which is larger, can be removed for a visual inspection of the straining element 14 or to allow for removal of larger debris that cannot pass through the valve (or the threaded bore 44).

The use of the threaded bore 40 and plug 42 will also save time when opening and closing the debris drain 26 compared to prior art designs that comprise an end cap with flanges and a plurality of fasteners used to secure the end cap to the pipeline strainer.

Retuning to FIG. 1, as discussed above, the pipeline strainer 10 is typically disposed within conduits or piping. In order to secure the ends 20, 24 of the pipeline strainer 10 to the conduits or other piping, the first end 20 of the pipeline strainer 10 and the second end 24 of the pipeline strainer 10 may each include a flange 50, 52 extending outwardly away therefrom. The flanges 50, 52 may each include a plurality of apertures 54a, 54b, each sized to receive a fastener (not shown), such as a bolt or screw. The apertures 54a, 54b may also be configured to be in alignment with apertures on flanges on the conduits (not shown). In some embodiments of the present invention, at least one aperture 54b in the flanges 50, 52 of the pipeline strainer 10 comprises a threaded bore, and at least one aperture 54a is smooth. By smooth it is meant that the inner surface of the aperture 54a is not engaged by a fastener extending there through. These fasteners are held in place by another item, such as a nut (not shown).

Figure 6:
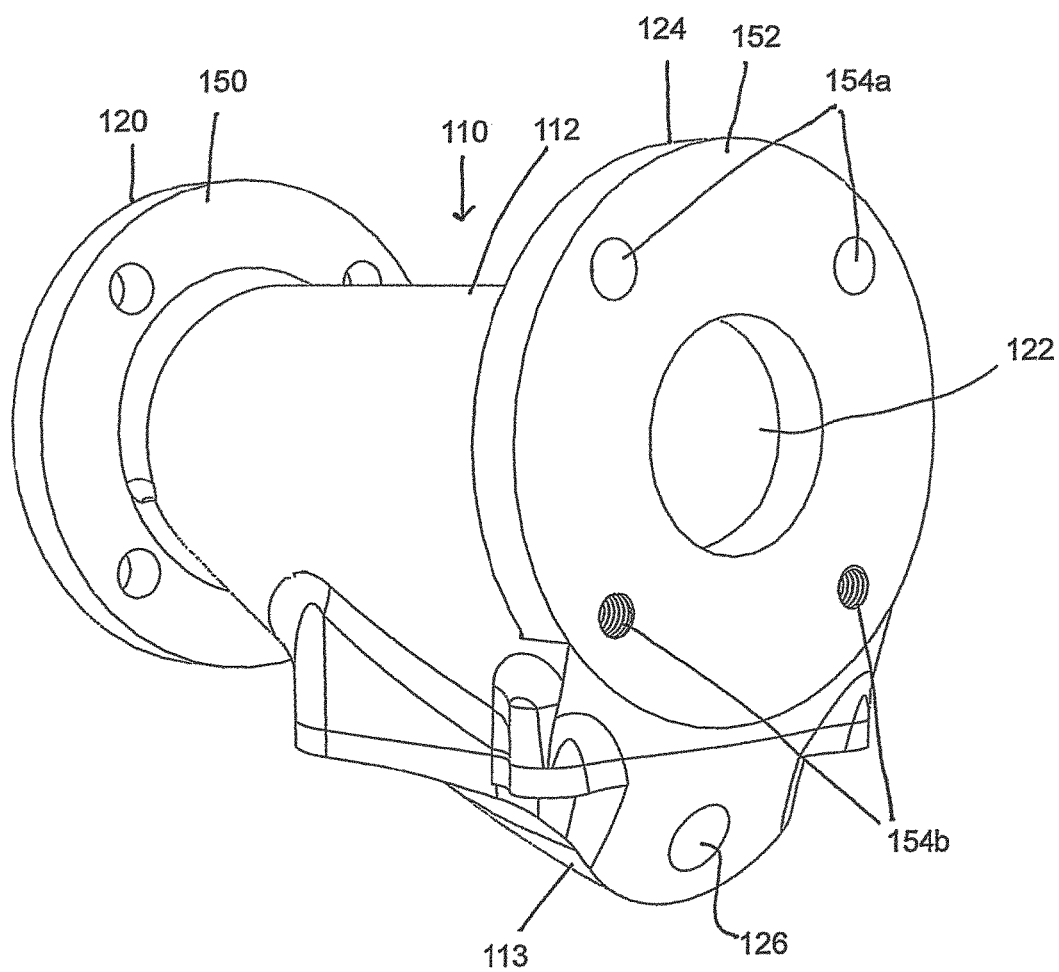
FIG. 6 is a side and rear isometric view of another embodiment of a pipeline strainer according to the present invention.
Figure 7:
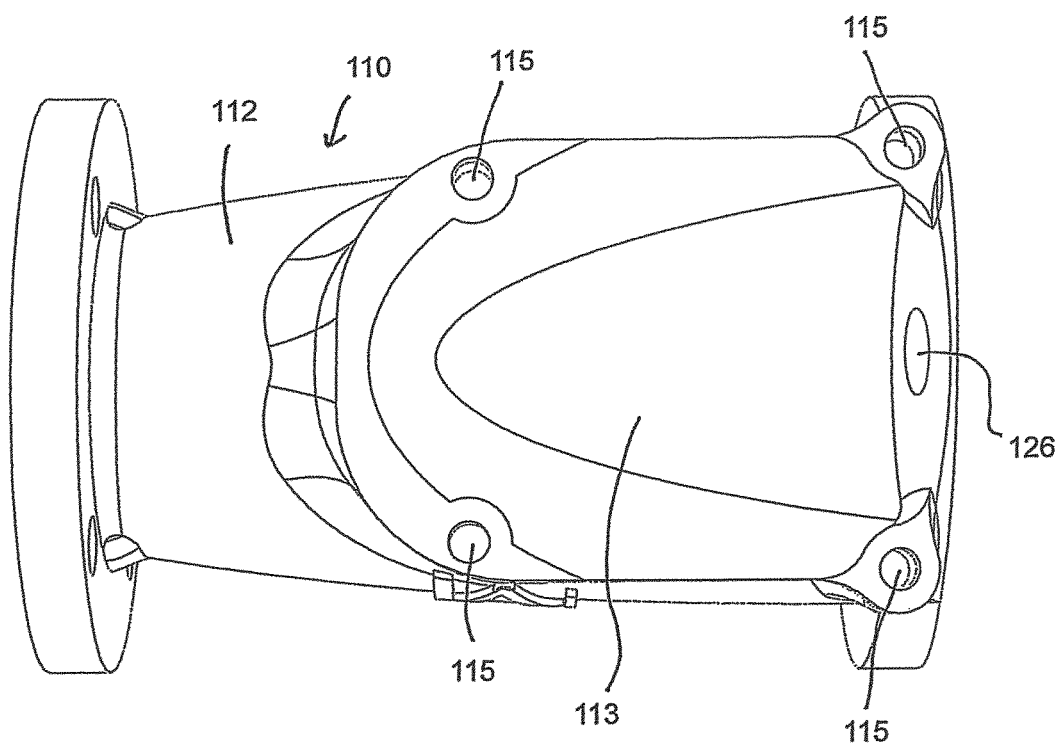
FIG. 7 is a bottom perspective view of the pipeline strainer shown in FIG. 6.

Turning to FIG. 6, another embodiment of a pipeline strainer 110 is shown. The pipeline strainer 110 includes a body 112 that together with a cover plate 113 has a Y shape. The cover plate 113 includes a debris drain 126 that may include a plug (not shown). Turning to FIG. 7, the cover plate 113 may be removably secured to a bottom of the body 112 via fasteners (not shown) and threaded apertures 115.

Figure 8:
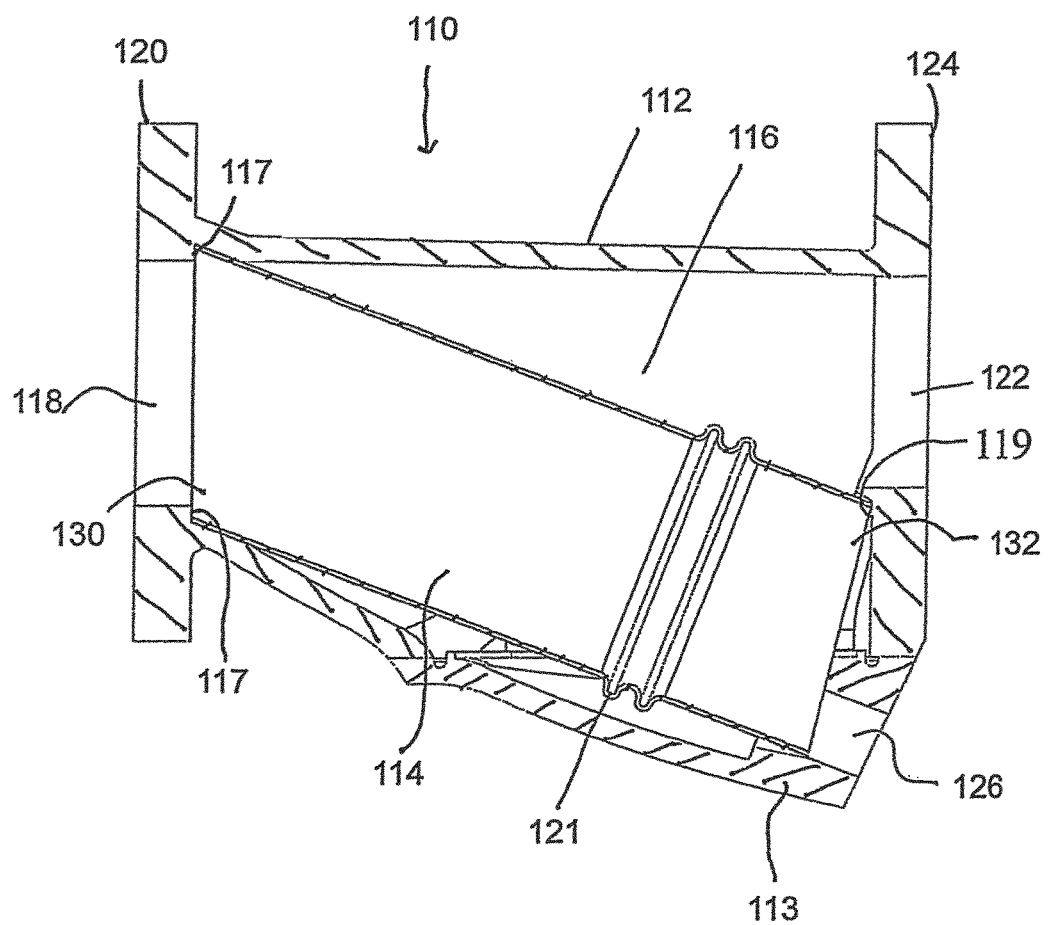
FIG. 8 is a cutaway side view of the pipeline strainer shown in FIG. 6 with a straining element according to various embodiments of the present invention.

With reference to FIG. 8, the cover plate 113 may be removed from the body to allow a straining element 114 to be inserted into a cavity 116 of the body 112. When inserted into the cavity 116, a first end 130 of the straining element 114 will be disposed generally parallel to the inlet 118 of the body 112. In order to maintain the positioning of the straining element, the cavity 116 may include a front shoulder 117 disposed proximate a first end 120 of the body 112 and a rear shoulder 119 disposed proximate a second end 124 of the body 112. As can be appreciated, a portion of the straining element 114 will extend out of the cavity 116 of the body 112 and will be covered by the cover plate 113 when the cover plate 113 is secured to the body 112. The remaining portions of the pipeline strainer 110 shown in FIGS. 6 to 8 include the same or similar features as the pipeline strainer 10 shown in FIGS. 1 to 3. Therefore those portions of the description from above are incorporated herein with the understanding that the reference numerals in FIGS. 6 to 8 have been increased by "100."

Figure 9:
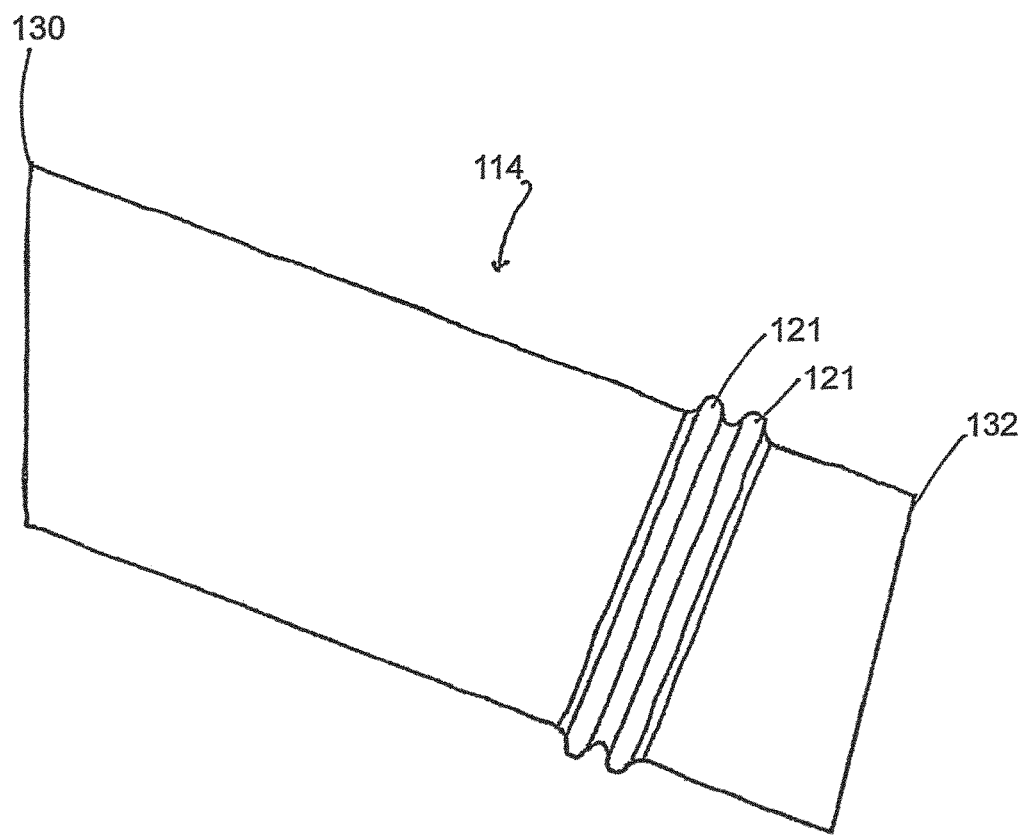
FIG. 9 is a side elevational view of the straining element shown in FIG. 8.

As shown in FIG. 9, the straining element 114 includes at least one corrugation 121. The corrugation(s) 121 provide the straining element 114 with flexibility which is particularly desirable when inserting the straining element 114 into the cavity 116 to better control the bending of the straining element 114. The flexibility is also desirable when the cover plate 113 is secured to the body 112 to allow the straining element 114 to absorb compression forces without deforming. The corrugation(s) 121 may be formed by utilizing rollers on both surfaces (inner and outer) of the straining element 114. As depicted in the Figures, the corrugation(s) 121 extends outward from the straining element 114; however, it is contemplated that the corrugation(s) 121 may extend inward as well, or include both inward and outward corrugations. It is also preferred that the corrugation(s) 121 are disposed closer to the second end 132 of the straining element 114 compared to the first end 130 of the straining element 114. The straining element 114 could be utilized in pipeline strainer 10 shown in FIGS. 1 to 3. The remaining portions of the straining element 114 shown in FIGS. 8 and 9 include the same or similar features as the straining element shown in FIGS. 4 and 5 and thus those portions of the description from above are incorporated herein.

Figure 11:
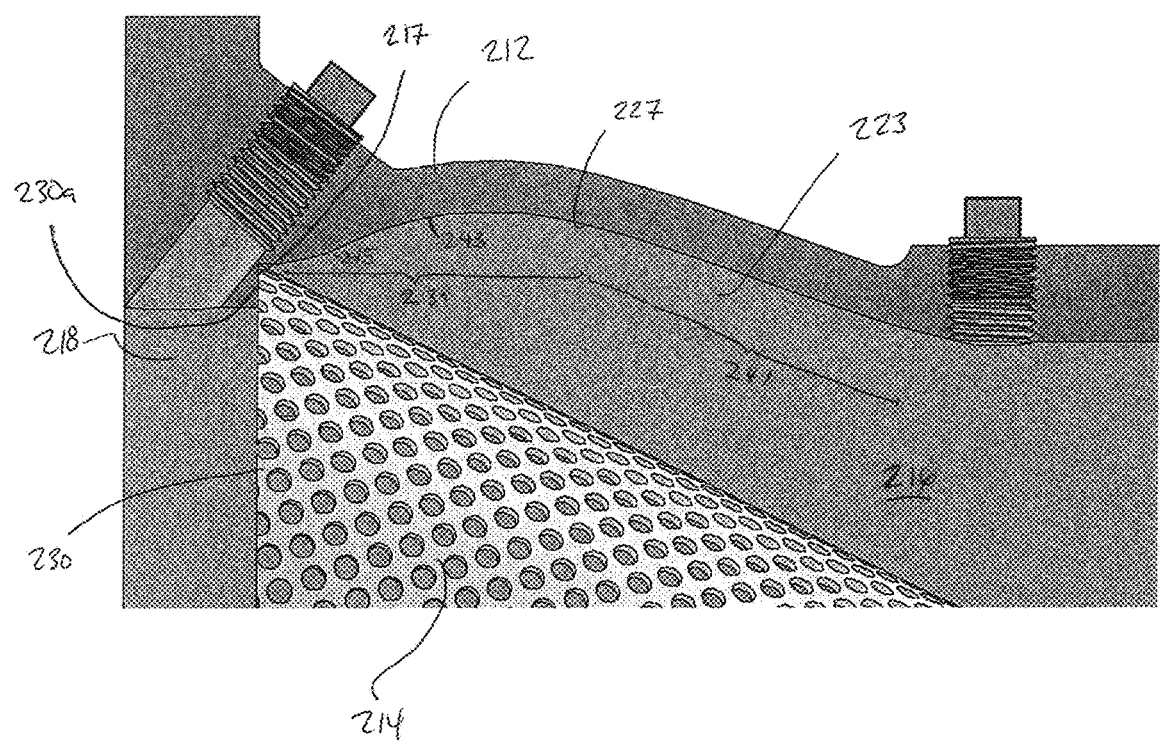
FIG. 11 is a more detailed view of a portion of FIG. 10.
Figure 12:
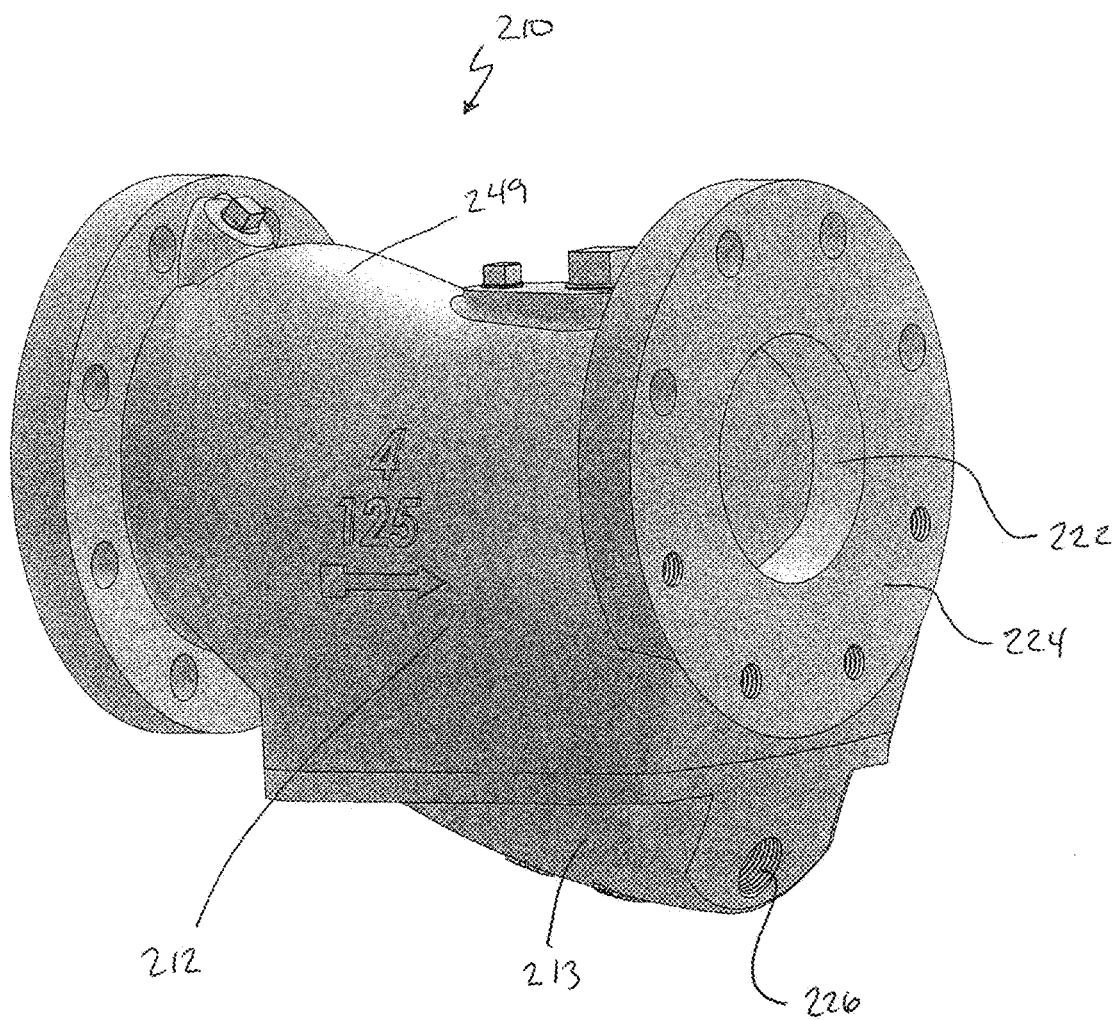
FIG. 12 is a side and end perspective view of the pipeline strainer of FIG. 10.

There currently exist many pipeline strainers that are in already in use in existing structures and configurations. These pipeline strainers are typically used in a space or gap, for example between two pipes, that spans a fixed distance. Accordingly, in order to utilize a pipeline strainer according to one or more embodiments of the present invention in such an existing configuration, the pipeline strainer will have to have to be configured to fit in the space and span the existing gap. In order to increase the amount of the straining element that is in the shortest flow path from the inlet to the outlet of the body, the present invention provides various embodiments that have elements or configurations to accommodate the insertion of the straining element into the cavity of the body. For example, in the embodiment shown in FIGS. 6 to 9, the straining element includes at least one corrugation 121. Instead of or in addition to such a straining element, the present invention also contemplates a modification to the body of the pipeline strainer, as shown in the embodiment of FIGS. 10 to 12.

Figure 10:
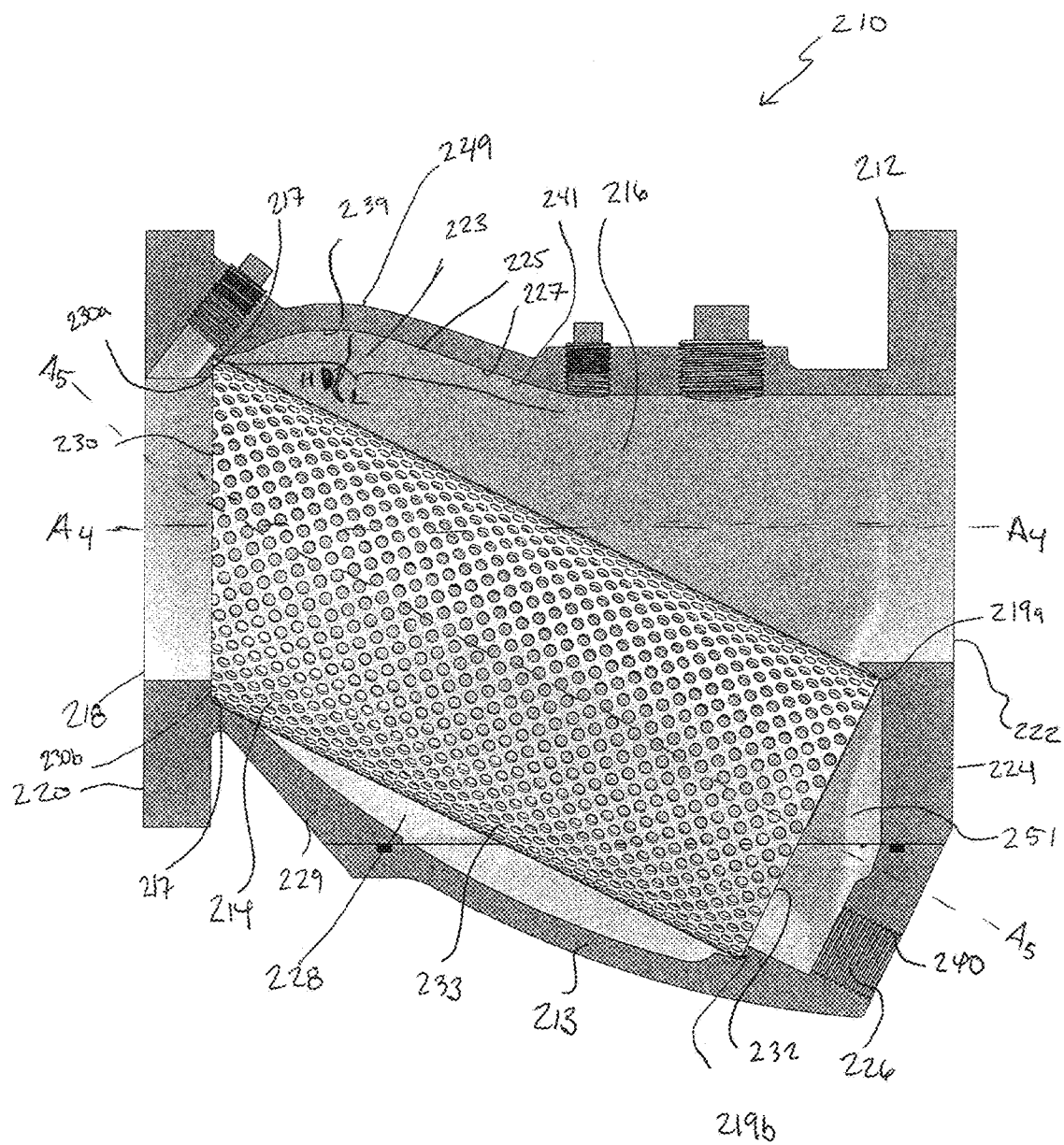
FIG. 10 is a cutaway side view of another embodiment of a pipeline strainer according to the present invention.

As shown in FIG. 10, another pipeline strainer 210 according to one or more embodiments of the present invention includes a body 212 that has a Y shape and a straining element 214 disposed within the body 212. The body 212 includes a cavity 216 that connects an inlet 218 and an outlet 222. The inlet 218 and the outlet 222 are disposed on opposite ends 220, 224 of the body 212. A longitudinal axis $A_4$ of the body 212 extends from the inlet 218 to the outlet 222. Preferably the inlet 218 and the outlet 222 both comprise circular apertures. In a most preferred embodiment, the inlet 218 and the outlet 222 are concentric and both have a center disposed on the longitudinal axis $A_4$ of the body 212.

The body 212 includes a debris collection chamber 228 that is formed by a portion 229 of the body 212 that extends outwardly away from the longitudinal axis $A_4$ of the body 212. Disposed on a side of the body 212, and preferably on the portion 229 of the body with the debris collection chamber 228, is a cover plate 213 which may be secured to the body 212 via one or more fasteners (not shown). Although not shown, it is contemplated that the cover plate 213 may be hingedly attached to the body 212 to allow an end of the cover plate 213 to be pivoted open to allow the straining element 214 to be disposed within the body 212 in the debris collection chamber 228. The cover plate 213 extends in a direction that is generally parallel with the longitudinal axis $A_4$ of the body 212.

A debris drain 226 is disposed in the body 212, preferably, on the cover plate 213. The debris drain 213 may comprise a threaded aperture 240 with a removable plug (not shown, but see FIG. 1) being configured complementarily to the threaded aperture 240.

The straining element 214 includes a first end 230 and a second end 232 opposite the first end 230 and both ends 230, 232 are preferably open. The straining element 214 may comprise a hollow, porous, generally cylindrical body 233 having a longitudinal axis $A_5$ extending from the first end 230 of the straining element 214 to the second end 232 of the straining element 214. As with the foregoing embodiments, an angle between the axis $A_5$ of the straining element 214 and the axis $A_4$ of the body 212 may be less than 30° and greater than 9.5° for example about 22.0°, 22.5°, 23.0°, 23.5°, 24.0°, 24.5°, 25.0°, 25.5°, 26.0°, 26.5°, 27.0°, 27.5°, 28.0° or 28.5°. Again, by the term "about" it is intended to mean the stated angle +/− 0.3°.

The first end 230 of the straining element 214 may lie in a plane that is oblique to the longitudinal axis $A_5$ of the straining element 214. The second end 232 of the straining element 214 may lie in a plane perpendicular to the longitudinal axis $A_5$ of the straining element 214. The first end 230 of the straining element 212 is disposed proximate the inlet 218 of the body 212, and the second end 232 of the straining element 212 is disposed proximate the debris drain 226. The debris drain 226 may be eccentric with the straining element 214. The straining element 214 may include the same or similar features as the straining element(s) described above and shown in other Figures and thus those portions of the description from above are incorporated herein.

In order to facilitate the insertion of the straining element 214 into the body 212 (when the cover plate 213 is removed from the body 212), the cavity 216 of the body 212 may include a recess 223 that forms a dome 225 with an inner surface 227 forming a portion of the cavity 216. The recess 223 is a space that extends away from the longitudinal axis $A_4$ of the body 212 compared to other portions or sections of the cavity 216 of the body 212 downstream of the straining element 216. By "dome" it is meant that the shape is generally similar to a dome or hemisphere. Additionally, as can be seen a length L of the recess 223 is greater than a height H of the recess 233. The depicted embodiment of the recess 223 is merely a preferred and exemplary embodiment.

As shown in FIG. 10, the cavity 216 of the body 212, and more particularly the recess 223, is defined in part by a surface, namely inner surface 227, which has, in a longitudinal cross-sectional view, a curvilinear portion 239 and a linear segment 241. Preferably, the cross-sectional view is created by a plane that includes the longitudinal axis $A_4$ of the body 212 and the longitudinal axis $A_5$ of the straining element 214. In contrast, as shown in FIG. 2 for example, the cavity 16 is defined by a surface that, in when viewed cross-sectionally, comprises only a relative straight (or linear) line from inlet 18 to the outlet 22.

As shown in more detail in FIG. 11, the curvilinear portion 239 of the surface 227 of the recess 223 preferably comprises at least a concave segment 243 and may also include a convex segment 245. The concave segment 243 is preferably disposed between the convex segment 245 and the linear segment 241. Additionally, the convex segment 245 is preferably disposed adjacent the inlet 218 and most preferably between the inlet 218 and the linear segment 241. It is further preferred that the linear segment 241 of the inner surface 227 of the recess 223 is not parallel with the longitudinal axis $A_4$ of the body 212. If the curvilinear portion 239 includes both the concave segment 243 and the convex segment 245, the convex segment 245 preferably retains or maintains the straining element 214 when the first end 230 of the straining element 214 is disposed proximate the inlet 218. Accordingly, the convex segment 245 acts as a retaining surface to maintain the first end 230 of the straining element 214 by interfering with movement of the first end 230 of the straining element 214 towards the outlet 222 or away from the inlet 218. Other configurations for a retaining surface are contemplated including, for example, notches, tabs, extensions, or other structures or devices capable of maintaining the position of the straining element with minimal intrusion into the cavity 216.

In order to insert the straining element 214 into the body 212, the cover plate 213 may be removed to provide access to the debris collection chamber 228. As the straining element 214 is inserted into the debris collection chamber 228 body 212, a leading edge 230a of the first end 230 of the straining element 214 will eventually contact the recess 223. Thus, the recess 223 is preferably disposed on a side of the body 212 opposite the cover plate 213.

Preferably, the first end 230 of the straining element 214 will initially contact the curvilinear portion 239, and most preferably, it will contact the concave segment 243 of the inner surface 227 of the recess 223. As the straining element 214 is inserted further into the debris collection chamber 228, the leading edge 230a will be guided towards the inlet 218 by the inner surface 227 of the recess 223 causing the straining element 214 to pivot into place. In the depicted embodiment, the first end 230 of the straining element 214 will follow along the curvilinear portion 239 of the inner surface 227 of the recess 223 until the leading edge 230a reaches a front shoulder 217 disposed proximate the inlet 218. The bottom edge 230b of the first end 230 of the straining element 214 may also contact or be disposed proximate the front shoulder 217. The use of the recess 223 allows for straining elements of particular sizes to be inserted into the body 212 to obtain the increased amount of straining element 214 in the flow path of the fluid through the body 212. With the cover plate 213 closed, the second end 232 of the straining element 214 may be held by a rear shoulder 219a in the body 212 and a second rear shoulder 219b in the cover plate 213. It is contemplated that upon closing the cover plate 213, a small amount of compression force is applied to the straining element 214 to ensure that it is firmly held, to avoid any separation between the ends 230, 232 and the shoulders 217, 219a, 219b which would allow debris to pass out of the straining element 214 and, along with the fluid, through the outlet 222.

As can be seen in FIG. 10 (and FIGS. 2 and 8), when the cover plate 213 is closed, the second end 232 of the straining element 214 is still disposed proximate the debris drain 226 but a gap 251 may be formed between the second end 232 of the straining element 214 and the debris drain 226. The gas 251 is bounded on its periphery by the rear shoulder 219a in the body 212 and the second rear shoulder 219b in the cover plate 213. Particulate materials and other debris removed by the straining element 214 can fall or otherwise be moved into the gap 251. This debris and other material may then accumulate in the gap 251 without blocking the apertures/pores in the straining element 214. This will allow for more debris to be removed without increasing the pressure drop associated with the fluid flowing though the pipeline strainer 210 and requiring the straining element 214 to be cleaned as frequently.

Turning to FIG. 12, due to the presence of the recess 223, the body 212 may include a rounded (i.e., bulbous) protrusion 249 or bump. Since the rounded protrusion 249 is a result of the recess 223, the rounded protrusion 249 is preferably on an opposite side of the body 212 from the cover plate 213. Thus, the rounded protrusion 249 is formed by the inclusion of the recess 223 in the body 212.

As shown the rounded protrusion 249 is preferably disposed proximate the inlet 218 of the body 212, that is, it is closer to the inlet 218 than to the outlet 222. For comparison, in the embodiment shown in FIG. 6, the side of the body that is opposite the cover plate is generally linear (straight cylindrical shape) that is parallel to the longitudinal axis $A_4$ of the body 212.

Notwithstanding the foregoing, it is contemplated that the body 212 could, alternatively, be made thick enough so that no outer rounded protrusion 249 is perceived as a result of the recess 223. Of course, such a construction will result in an increase of material and thickness of the body 212. As will be appreciated this will increase the cost and the weight of the body 212.

The remaining elements and portions of the pipeline strainer 210 in FIG. 10 may be the same as any of the other depictions and descriptions herein and those elements of the other descriptions are incorporated herein by reference.

In a comparison of pipeline strainers of various sizes according to the present invention, and more particularly in accordance with the embodiment shown in FIGS. 10 to 12, to similarly sized existing pipeline strainers, the pipeline strainers of various sizes according to the present invention had surprising and unexpected superior results. For example, in a comparison of 4-inch pipeline strainers (i.e., a pipeline strainer used for a 4 inch diameter pipe), the 4-inch pipeline strainer according to the present invention has a Cv value more than 1.5 times the Cv value of existing 4-inch pipeline strainers. As would be appreciated, the Cv value is the number of gallons per minute that will flow through the pipeline strainer when the pressure differential through the pipeline strainer is one pound per square inch. A comparison of 3-inch pipeline strainers showed that the 3-inch pipeline strainer according to the present invention has a Cv value more than 1.4 times that of the Cv value of existing 3-inch pipeline strainers.

Additionally, with a 50% blockage of the straining element in a pipeline strainer according to the present invention, and more particularly in accordance with the embodiment shown in FIGS. 10 to 12, the pipeline strainer according to the present invention was found to exceed the performance of an existing similarly sized pipeline strainer with minimal to no blockage of the straining element.

In a simulated price modeling, a single 4-inch pipeline strainer according to the present invention would provide a savings of over $300 a year in energy operating costs compare to an existing similarly sized pipeline strainer.

Thus, the present invention provides a more efficient and cost effective pipeline strainer compared to existing designs.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A pipeline strainer comprising:
a body comprising an inlet for a fluid, an outlet for the fluid, a debris drain, and a cavity inside of the body connecting the inlet and the outlet,
wherein the inlet and outlet are disposed on opposite ends of the body and a longitudinal axis of the body extends between the inlet and the outlet, and
wherein the cavity includes a first recess forming a dome and having an inner surface forming a portion of the cavity, wherein the first recess extends away from the longitudinal axis of the body; and,
a straining element disposed in the cavity, the straining element having a first open end and a second end opposite the first open end, the first open end of the straining element contacting the inlet of the body, and the second end of the straining element disposed adjacent the debris drain,
wherein a longitudinal axis of the straining element extends from the first open end to the second end such that an angle between the longitudinal axis of the straining element and the longitudinal axis of the body is less than 90°, and
wherein when the straining element is inserted into the cavity, the inner surface of the first recess is configured to guide the first open end of the straining element to the inlet of the body.

2. The pipeline strainer of claim 1 further comprising a shoulder disposed between the inlet and the first recess, the shoulder being configured to receive a portion of the first end of the straining element.

3. The pipeline strainer of claim 2 wherein a portion of the inner surface of the first recess includes a retaining surface configured to maintain the first end of the straining element adjacent the shoulder.

4. The pipeline strainer of claim 1 wherein the straining element comprises a hollow body, and wherein the first end of the straining element lies in a plane that is oblique to the longitudinal axis of the straining element.

5. The pipeline strainer of claim 4 wherein the second end of the straining element lies in plane perpendicular to the longitudinal axis of the straining element.

6. The pipeline strainer of claim 1 further comprising a cover plate configured to be removably secured to the body, the cover plate including the debris drain.

7. The pipeline strainer of claim 6 wherein the cover plate includes a second shoulder configured to receive the second end of the straining element.

8. The pipeline strainer of claim 1, wherein the straining element is disposed such that the angle between the longitudinal axis of the body and the longitudinal axis of the straining element is between 1° and 30°.

9. A pipeline strainer comprising:
a body comprising an inlet for a fluid, an outlet for the fluid, a debris drain, and a cavity inside of the body connecting the inlet and the outlet, wherein the inlet and outlet are disposed on opposite ends of the body and wherein a longitudinal axis of the body extends from the inlet to the outlet; and,
a straining element disposed in the cavity, the straining element having a first open end and a second end opposite the first open end, the first open end of the straining element contacting the inlet of the body, and the second end of the straining element disposed adjacent the debris drain, wherein a longitudinal axis of the straining element extends from the first open end to the second end;
wherein an angle between the longitudinal axis of the body and the longitudinal axis of the straining element is between 1° and 30°; and,
wherein the cavity of the body is defined in part by a surface which includes a curvilinear portion and a first linear segment, the surface extending away the longitudinal axis of the body when the body is viewed cross-sectionally through a plane that includes the longitudinal axis of the straining element and the longitudinal axis of the body,
wherein, in a direction from the inlet to the outlet, the curvilinear portion comprises a convex segment and a concave segment, and wherein the concave segment is adjacent to the first linear segment,
and wherein when the straining element is inserted into the cavity, the inner surface of the first recess is configured to guide the first open end of the straining element to the inlet of the body.

10. The pipeline strainer of claim 9 wherein the convex segment is disposed adjacent the inlet and between the inlet and the linear segment.

11. The pipeline strainer of claim 9 wherein the straining element comprises a hollow body, and wherein the first end of the straining element lies in a plane that is oblique to the longitudinal axis of the straining element.

12. The pipeline strainer of claim 9 wherein the second end of the straining element lies in plane perpendicular to the longitudinal axis of the straining element.

* * * * *